United States Patent
Holbrook

(10) Patent No.: US 10,612,215 B2
(45) Date of Patent: Apr. 7, 2020

(54) WATER STORAGE SYSTEMS

(71) Applicant: Living Water Storage Solutions LLC, Farmington, UT (US)

(72) Inventor: Ben W. Holbrook, Kaysville, UT (US)

(73) Assignee: Living Water Storage Solutions LLC, Farmington, UT (US)

( * ) Notice: Subject to any disclaimer, the term of this patent is extended or adjusted under 35 U.S.C. 154(b) by 116 days.

(21) Appl. No.: 15/896,300

(22) Filed: Feb. 14, 2018

(65) Prior Publication Data
US 2019/0249400 A1 Aug. 15, 2019

(51) Int. Cl.
*E03B 7/04* (2006.01)
*E03B 11/02* (2006.01)
*E03B 11/06* (2006.01)
*B65D 21/02* (2006.01)
*B65D 88/02* (2006.01)

(52) U.S. Cl.
CPC .............. *E03B 7/04* (2013.01); *E03B 11/02* (2013.01); *E03B 11/06* (2013.01); *B65D 21/0201* (2013.01); *B65D 88/022* (2013.01); *Y10T 137/86187* (2015.04)

(58) Field of Classification Search
CPC .......... E03B 11/06; E03B 11/02; B65D 7/04; B65D 88/022; B65D 21/0201
USPC .......................... 137/571, 572, 573, 575, 551
See application file for complete search history.

(56) References Cited

U.S. PATENT DOCUMENTS

| | | | | |
|---|---|---|---|---|
| 1,531,808 A * | 3/1925 | Parkinson | ............... | E03C 1/044 210/181 |
| 4,663,089 A * | 5/1987 | Lowry | ............... | B01D 19/0005 210/221.2 |
| 4,962,789 A * | 10/1990 | Benscoter | ............... | E03B 11/02 137/357 |
| 5,046,529 A * | 9/1991 | Corella | .................... | E03B 11/06 137/590.5 |
| 5,248,417 A * | 9/1993 | Reid | .................... | B01D 24/007 210/195.1 |
| 6,378,546 B1 * | 4/2002 | Hansen | .................... | E03B 11/02 137/208 |
| 7,631,658 B2 * | 12/2009 | Graeve, Jr. | ............... | B28C 7/12 137/558 |
| 9,631,859 B2 * | 4/2017 | Park | ...................... | F25D 23/126 |
| 2013/0334256 A1 * | 12/2013 | Pioli | ...................... | B65D 25/42 222/185.1 |
| 2014/0345721 A1 * | 11/2014 | Keisel | ....................... | E03B 5/02 137/565.17 |
| 2016/0060850 A1 * | 3/2016 | Johnson | .................. | E03B 11/06 137/12 |
| 2019/0010681 A1 * | 1/2019 | Shi | ............................ | E03B 7/04 |

* cited by examiner

Primary Examiner — Umashankar Venkatesan
(74) Attorney, Agent, or Firm — Kirton McConkie; Brian Tucker

(57) ABSTRACT

Water storage systems are provided to facilitate storing water for use when a primary source of water becomes unavailable. These water storage systems can be configured to connect into a home's or a building's plumbing to enable the water tanks of the system to be easily filled and regenerated. The water storage systems may include a support system to maximize space utilization and to possibly provide seismic protection.

20 Claims, 5 Drawing Sheets

WATER STORAGE SYSTEMS

CROSS-REFERENCE TO RELATED APPLICATIONS

N/A

BACKGROUND

Various reasons exist for storing water. For example, in case of a natural disaster, the local water supply may be disrupted for an extended period of time. Even if the water supply is not disrupted, it may become polluted or contaminated. To avoid being without water during such scenarios, people oftentimes use storage tanks to store water. For example, it is common for home owners to store water in the garage or a basement storage room in 55 gallon water barrels. When there is limited space available, individuals may use a number of small containers, ranging from dedicated water containers to milk jugs, to store water.

Regardless of how water is stored, various problems arise. For example, the storage tanks or containers occupy a relatively large amount of space. Oftentimes, individuals do not have adequate space or are unwilling to dedicate adequate space to support themselves for any meaningful amount of time. Also, even if individuals store water, it may become unusable before it is needed. If water is untreated, it may become unpotable within six months. Even if it is initially treated, it will likely require subsequent treatments (e.g., every 5 years if treated with a chlorine-based preserver). Additionally, once filled, storage tanks may be too heavy to move which may discourage individuals from using them. Further, even if water has been stored and is safe to consume in the event of an emergency, many individuals fail to acquire components (e.g., a pump) for extracting the water from the storage tank. This lack of the necessary components combined possibly with the weight of the tank may make it difficult or impossible to access the water. In the face of all these difficulties, many simply choose not to store water.

BRIEF SUMMARY

The present invention extends to water storage systems that facilitate storing water for use when a primary source of water becomes unavailable. These water storage systems can be configured to connect into a home's or a building's plumbing to enable the water tanks of the system to be easily filled and refreshed. The water storage systems may include a support system to maximize space utilization and to possibly provide seismic protection.

In one embodiment, the present invention is implemented as a water storage system for use with water storage tanks. The water storage system includes: an inlet for connecting a first tank to a water source, the inlet including an upper interface component by which the inlet couples to the first tank and a flow control component for enabling water to flow from the water source into the first tank; an upper inter-tank connection for interconnecting the first tank with a second tank, the upper inter-tank connection including an upper interface component for each tank and one or more fittings or pipes for connecting the upper interface components together; a lower inter-tank connection for interconnecting the first tank with the second tank, the lower inter-tank connection including a lower interface component for each tank and one or more fittings or pipes for connecting the lower interface components; and an outlet that is configured to couple to the lower inter-tank connection, the outlet including a flow control component for enabling the water to flow out from the first and second tanks.

In another embodiment, the present invention is implemented as a water storage system that includes a support and one or more water storage pods. Each pod includes a support structure that houses a tank and that is configured to mount to the support. Each tank includes multiple ports each of which is configured to function as an inlet or an outlet for the flow of water.

In another embodiment, the present invention is implemented as a water storage system comprising: an inlet for connecting a first tank to a building's plumbing, the inlet including an upper interface component by which the inlet couples to the first tank and a flow control component for enabling water to flow from the plumbing into the first tank; an upper inter-tank connection for interconnecting the first tank with a second tank, the upper inter-tank connection including an upper interface component for each tank and one or more fittings or pipes for connecting the upper interface components together; a lower inter-tank connection for interconnecting the first tank with the second tank, the lower inter-tank connection including a lower interface component for each tank and one or more fittings or pipes for connecting the lower interface components; an outlet that is configured to couple to the lower inter-tank connection, the outlet including a flow control component for enabling the water to flow out from the first and second tanks; and a venting component that is configured to vent air from within the upper inter-tank connection.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Water storage systems in accordance with embodiments of the present invention provide a modular and customizable solution to an individual's, group's, business's or organization's water storage needs. The water storage systems can be employed to quickly and easily adapt existing water storage tanks into a water storage system that integrates with plumbing. In some embodiments, the water storage systems can include a support for mounting water tanks in a space-optimizing manner. Accordingly, the water storage systems of the present invention facilitate storing water in a manner that will ensure that the water will be usable in an emergency situation and without occupying excessive space.

Figure 1:
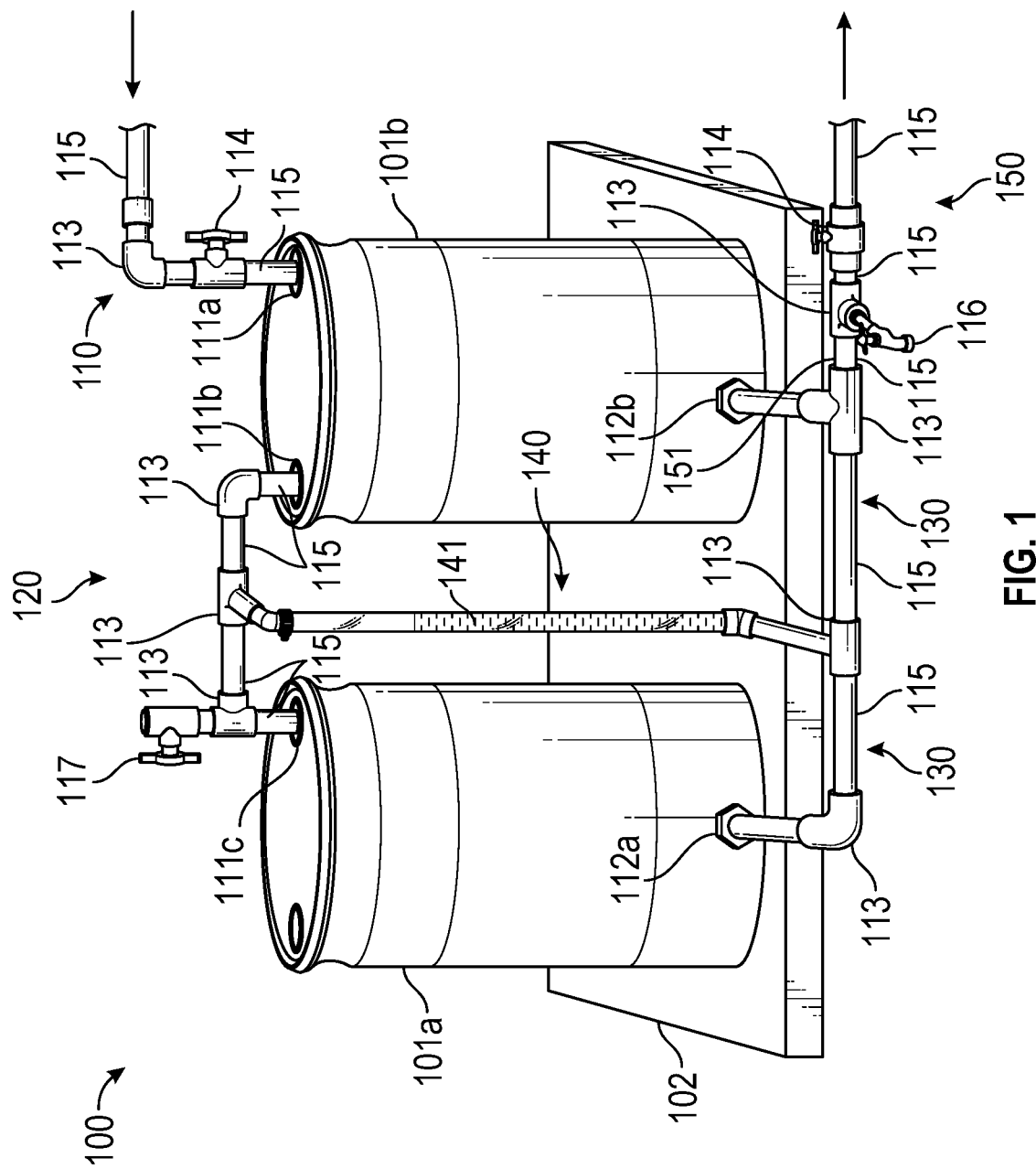
FIGS. 1 and 2 each illustrate an embodiment of a water storage system that includes a platform for supporting the water tanks.

FIG. 1 illustrates a water storage system 100 in accordance with embodiments of the present invention. Water storage system 100 can be used in any building, structure, portable container, or trailer whether for home or commercial use. Water storage system 100 includes tanks 101a, 101b that are supported on a raised platform 102. Although two tanks are shown, water storage system 100 may include any number of tanks. In such cases, multiple platforms 102 may be used in a side-by-side fashion if necessary to accommodate the additional tanks. Tanks 101a, 101b may typically be 55 gallon plastic drums that are commonly used in a standalone fashion to store water. However, any tank could be used.

Water storage system 100 includes a number of components that are used to interconnect each tank (e.g., tanks 101a and 101b) and to enable the interconnected tanks to be connected into a building's plumbing. These components include upper interface components 111, lower interface components 112, fittings 113, flow control components 114, pipes 115, dispensing component(s) 116, and venting component(s) 117.

Upper interface component 111 may be configured as a threaded cap that can replace the existing caps in a 55 gallon drum or other tank with similar caps. However, in other embodiments, upper interface component 111 may be configured to couple to and insert through the existing caps. In further embodiments, upper interface component 111 may couple to the top wall or side wall of the tank rather than through a cap. As an example, upper interface component 111 can be a bulkhead fitting that includes a first component that is positioned inside the tank (or cap) and a second component that is positioned outside the tank (or cap) but secured to the first component. In any case, upper interface component 111 provides an interface external to the tank for connecting the tank either to another tank or to a water source such as the building's plumbing. In some embodiments, upper interface component 111 may include quick-connect components.

Three upper interface components 111a-111c are shown in the example in FIG. 1. Upper interface components 111a-111c can be configured in the same manner to allow them to be interchangeable. Upper interface component 111a is shown as being connected through the cap of tank 111a (or may be integrated into a cap that replaces the existing cap of tank 111a) and to the plumbing to thereby form an inlet 110 for water to enter water storage system 100. A flow control component 114 is connected between upper interface component 111a and the plumbing, and functions to selectively allow or block the flow of water into water storage system 100. As an example, flow control component 114 can be a manual valve that the user can actuate to allow water to flow into the system or an automatic valve controlled by a control system.

In other embodiments, upper interface components 111 could be configured to couple to a tank through another opening (i.e., not through the caps that are commonly provided with such tanks). For example, a custom cap that is capable of integrating two upper interface components 111 could be provided and configured to couple to an opening in the top of a tank. In such cases, the user could select to integrate one or two upper interface components into the cap depending on where a particular tank will be situated relative to other tanks in the water storage system.

Upper interface component 111b is shown as being connected through the cap opposite upper interface component 111a while upper interface component 111c is shown as being connected through a cap on tank 101a. Various fittings 113 and pipes 115 can be employed to interconnect upper interface components 111b and 111c to thereby form an upper inter-tank connection 120. Although water storage system 100 is shown with two tanks 101a, 101b, system 100 may include one or more additional tanks that are interconnected using the same or similar upper inter-tank connection 120.

In the depicted embodiment, a venting component 117 is integrated into upper inter-tank connection 120 to enable air to vent from within tanks 101a, 101b. In embodiments of water storage system 100 that include more than two tanks, venting component 117 may be integrated into only one of the upper inter-tank connections 120 or may possibly be integrated into more than one or all of the upper inter-tank connections 120. Venting component 117 may be in the form of a manual or automatic valve that can be opened and closed to selectively vent air from the tanks, in the form of a one-way valve that only allows air to escape the tanks, or in another suitable form. Venting component 117 can be operated during both filling and draining of tanks 101a, 101b. For example, while the tanks are being filled, venting component 117 can be opened to allow air to escape the tanks, whereas, while the tanks are being emptied, venting component 117 can be opened to allow air to enter the tanks.

Each of tanks 101a, 101b also includes a lower interface component 112a, 112b respectively. Lower interface components 112a, 112b are coupled towards the bottom of the respective tank to thereby allow water to flow out of the tanks. In some embodiments, lower interface components 112a, 112b may be in the form of bulkhead fittings that can be integrated into the wall of existing water storage tanks. A number of fittings 113 and pipes 115 can be employed to interconnect lower interface components 112a, 112b to thereby form a lower inter-tank connection 130. In embodiments that include more than two tanks, a lower inter-tank connection 130 can be provided for each additional tank. In some embodiments, a flow control component 114 can be coupled inline with lower interface component 112a and/or 112b to thereby function as an isolation valve to isolate the water of the respective tank 101a, 101b. Although system 100 may be configured for use with existing tanks, in some embodiments, tanks could be custom designed to incorporate upper interface components 111 and lower interface component 112.

When system 100 is being filled, lower inter-tank connection 130 will allow water that flows into tank 101b via inlet 110 to flow into tank 101a so that both tanks become filled. Also, during this filling process, upper inter-tank connection 120 and venting component 117 will ensure that the water level in each of tanks 101a, 101b remains substantially the same (i.e., venting component 117 will enable air to flow equally out from tanks 101a and 101b). In embodiments with more than two tanks, the upper and lower inter-tank connections 120/130 between each adjacent pair of tanks will equally ensure that all tanks fill to substantially the same level.

In some embodiments, system 100 may include a water level indicator 140 which can provide a visual indication of the water level within each tank. For example, in FIG. 1, system 100 includes a transparent pipe (or tube) 141 that is coupled between upper inter-tank connection 120 and lower inter-tank connection 130. Because pipe 141 is coupled between upper inter-tank connection 120 and lower inter-tank connection 130, the level of the water within pipe 141 will be substantially the same as the water level within each of tanks 101a, 101b. The transparency of pipe 141 will allow the user to quickly identify when system 100 has been filled to a desired level so that the user may close flow control component 114. In other embodiments, water level indicator 140 may include a sensor (e.g., a sensor coupled to or embedded within pipe 141 or possibly within either of tanks 101a, 101b) which can detect when the water level has reached a particular level and can automatically close flow control component 114.

System 100 may also include an outlet 150 by which water may exit tanks 101a, 101b. In the depicted embodiment, outlet 150 is in the form of various fittings 113 and pipes 115 that couple to lower inter-tank connection 130. Outlet 150 includes a flow control component 114 (which may be a manual or automatic valve) which may be actuated to selectively allow water to flow from system 100.

In some embodiments, outlet 150 may be coupled directly into a building's plumbing. For example, system 100 could be connected in parallel with the building's plumbing so that the water stored in system 100 could be refreshed by simply opening flow control components 114 of inlet 110 and outlet 150. In such cases, water flowing out of outlet 150 will be provided back to the plumbing so that the water will not be wasted. Alternatively, in other embodiments, outlet 150 could be connected to a drain for disposal of the water in the sewer or to a hose to use the water for irrigation or a graywater system.

In FIG. 1, outlet 150 includes a spigot (or hose bib) 116 which provides a way to selectively obtain water from system 100. For example, if water was no longer available via the building's plumbing (e.g., in case of a natural disaster), individuals would be able to obtain the water stored in tanks 101a, 101b via spigot 116. By placing tanks 101a, 101b on platform 102, spigot 116 will be sufficiently elevated to enable this access. In some embodiments, spigot 116 could be incorporated into lower inter-tank connection 130 rather than into outlet 150. Also, in some embodiments, lower inter-tank connection 130 may include isolation valves (not shown) to allow the water within a particular tank to be isolated from the water within another tank or tanks. Such isolation valves could be connected inline with the lower interface component 112 of the tank to be isolated.

Although not shown, embodiments of system 100 may include an automatic timer or other control system for periodically refreshing the water within tanks 101a, 101b. For example, a control system could be connected (e.g., via a wired or wireless connection) to flow control components 114 and venting component 117 and could be configured to periodically open these components to allow tanks 101a, 101b to be filled with fresh water. This may be particularly beneficial when inlet 110 and outlet 150 are connected in parallel with the building's plumbing since the stored water will not be wasted, but will rather be distributed through the plumbing for use within the building. In such cases, the control system could be configured to regenerate the stored water at relatively frequent intervals. In other embodiments, a control system may be configured to first open flow control component 114 of outlet 150 to thereby drain tanks 101a, 101b prior to opening flow control component 114 of inlet 110 to again fill tanks 101a, 101b.

As indicated above, system 100 may be provided for use with existing water storage tanks. For example, an individual may already be using tanks to store water in his or her garage or basement. In such cases, the individual may obtain system 100 in the form of platform 102, inlet 110, one or more upper inter-tank connections 120, one or more lower inter-tank connections 130, water level indicator 140 and outlet 150 and integrate these components into the existing tanks including possibly interconnecting the system with the existing plumbing.

Figure 2:
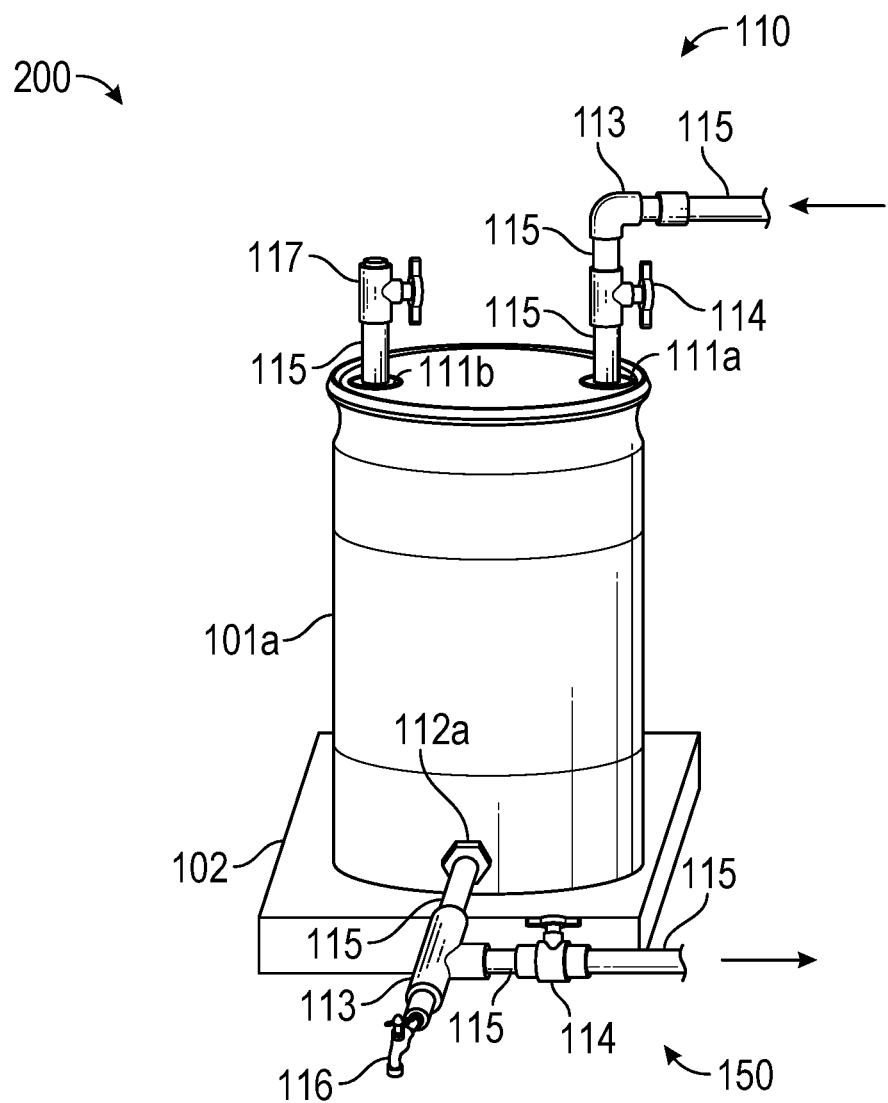

FIG. 2 provides an example of a water storage system 200 that includes a single tank 101a. System 200 is similar to system 100 but does not include upper inter-tank connection 120 or lower inter-tank connection 130. In such embodiments, venting component 117 can be coupled directly to upper interface component 111b. Although not shown, system 200 could include water level indicator 140 which could be connected between upper interface component 111b (or upper interface component 111a) and lower interface component 112a. As represented in FIG. 2, platform 102 could be sized to accommodate any particular number of tanks. Although not shown, platform 102 may also be configured with a number of spaced openings to allow the tanks to be tied down to the platform via ratcheting straps or another suitable mechanism to ensure that the tanks will not tip over during an earthquake.

Figure 3A:
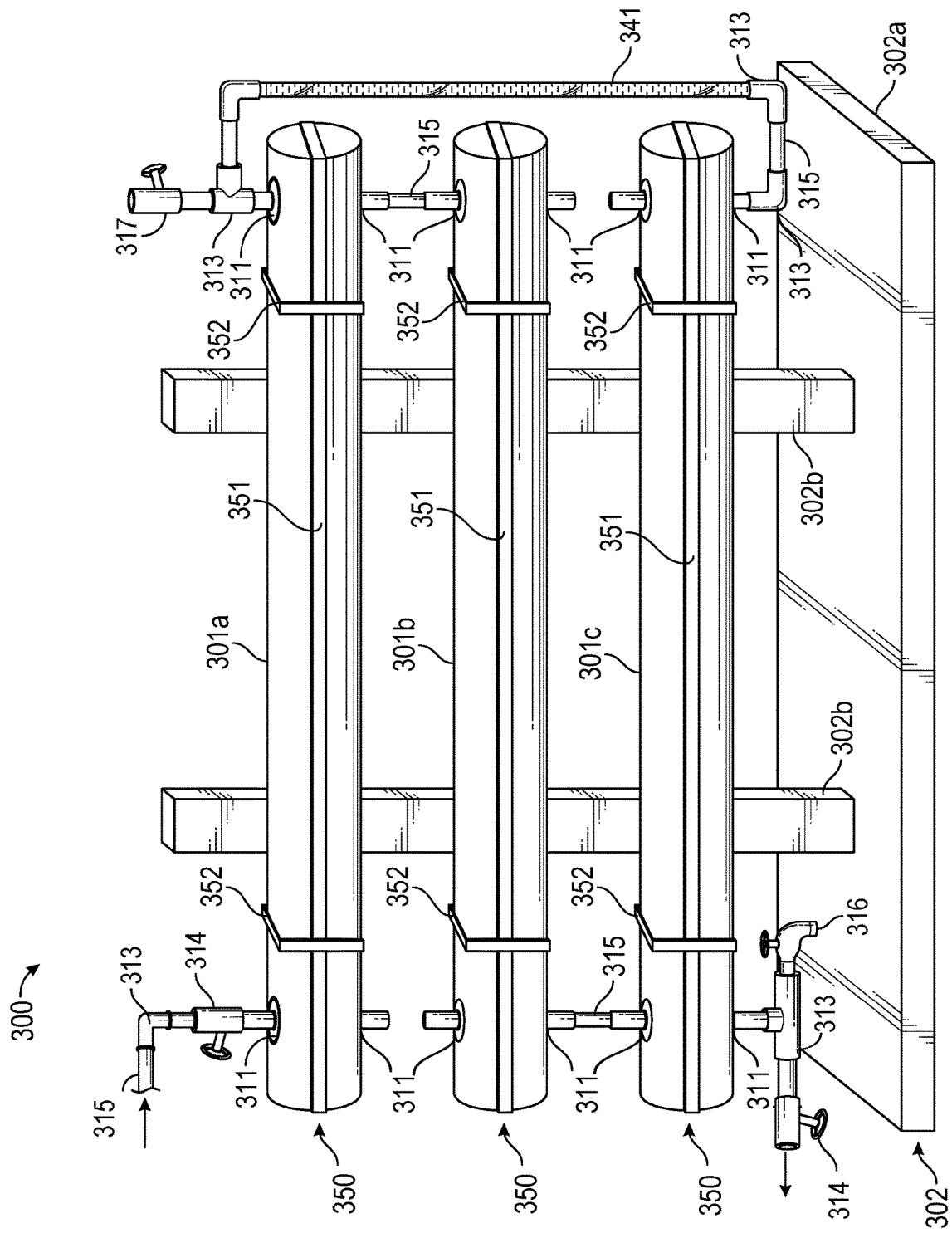
FIGS. 3A and 3B illustrate a front and side view respectively of an embodiment of a water storage system that includes a support for mounting the water tanks.
Figure 3B:
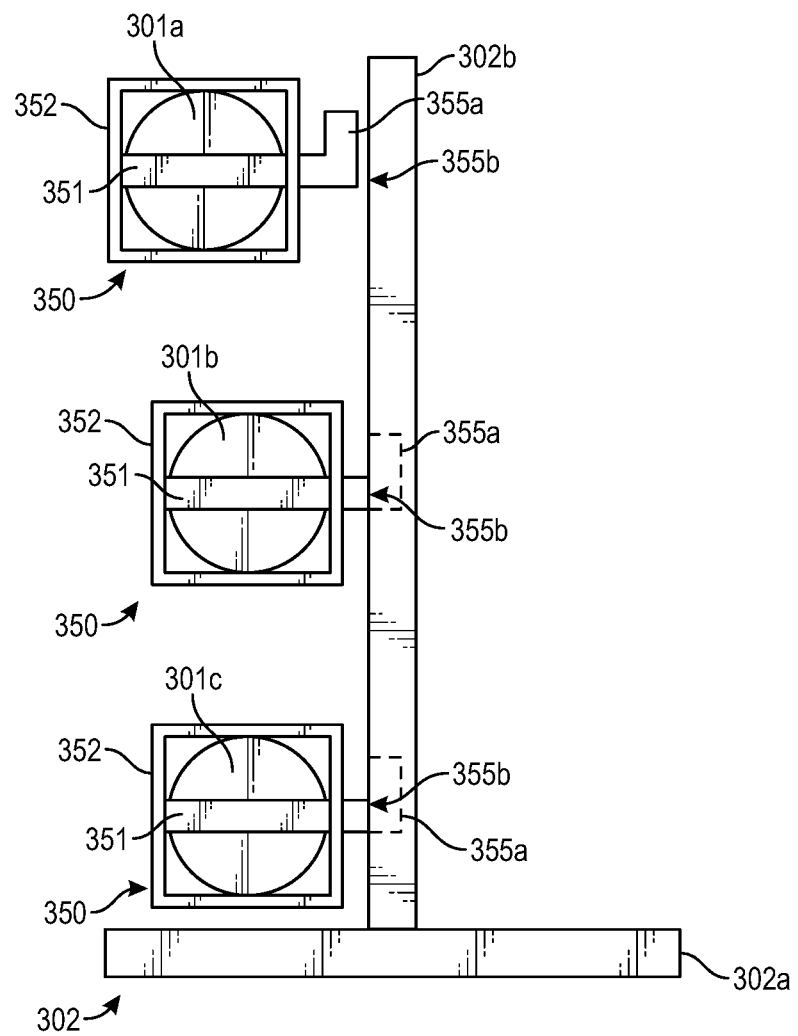

FIGS. 3A and 3B illustrate front and side views respectively of a water storage system 300 in accordance with other embodiments of the present invention. For simplicity, various components included in FIG. 3A are not shown in FIG. 3B. System 300 is similar to system 100 but is designed for more compact storage of water. In particular, system 300 includes one or more water storage pods 350 which are configured to couple to a support 302 in a compact, space-saving manner. Support 302 may include a base 302a and one or more posts 302b that extend from base 302a. Base 302a and posts 302b can be sized and shaped in various ways to fit a particular storage location. For example, in FIGS. 3A and 3B, base 302a and posts 302b are configured to enable pods 350 to be coupled on both sides of the posts. In other embodiments, the depth of base 302a may be reduced so that posts 302b may be positioned directly against (and possibly mounted to) a wall or other structure and so that pods 350 may be mounted only on one side. Because support 302 allows pods 350 to be stored in a vertical orientation, more water can be stored in a smaller footprint.

System 300 is shown as including three pods 350 each of which includes a water storage tank 301a, 301b, and 301c respectively (generally tanks 301). Each of tanks 301 can be formed as a cylindrical or other elongated shape and can include a pair of ports 311 at each end. Tanks 301 can be formed of pipe that meets potable water requirements or from other suitable plastics or polymers. The ports 311 in each pair can be on opposite sides of tank 301 such that one port 311 will be facing upward and one port will be facing downward on both ends of the tank. This configuration can allow tanks 301 to be interconnected in any orientation or configuration. In other embodiments, however, each tank 301 could be custom configured with ports 311 only where necessary for a particular installation.

Each pod 350 includes a support structure that may be formed from a horizontally-oriented support structure 351 and one or more interconnected vertically-oriented support structures 352. In the depicted embodiment, horizontally-oriented support structure 351 wraps around the length of tank 301 while two vertically-oriented support structure 352 wrap around the circumference of tank 301 at opposing ends. Horizontally-oriented support structures 351 can prevent tank 301 from sliding horizontally with respect to base 302a while vertically-oriented support structures 352 can support the weight of tank 301 while also preventing tank 301 from moving vertically with respect to base 302a. The support structure can therefore ensure that pods 350 will remain mounted to support 302 during an earthquake.

As shown in FIG. 3B, the support structure of pods 350 can include one or more securing structures 355a which allow the pod to be removably coupled to posts 302b. In the depicted embodiment, securing structures 355a are shown as upwardly oriented hooks that insert through corresponding openings 355b in posts 302b. However, securing structures 355a and posts 302b could be configured in other ways to allow pods 350 to be removably coupled to posts 302b.

Because pods 350 are removably coupled to posts 302b, they can be removed and transported if necessary. For example, in case of an emergency that requires fleeing the building for a duration of time, one or more of pods 350 could be removed and transported as a source of water. As will be further described below, pods 350 can include quick-connect interfaces to facilitate decoupling the pods from system 300 without spilling the water. The configuration and positioning of vertically-oriented support structures 352 can facilitate carrying pods 350. For example, a pod 350 could include two vertically-oriented support structures 352 that are spaced closely enough to allow a single individual to grasp both structures to lift and remove the pod from posts 302b. Alternatively, two individuals could grasp horizontally-oriented support structures 351 and/or vertically-oriented support structures 352 at opposing ends of the pod.

As mentioned above, each tank 301 can include a pair of ports 311 on each end, each of which can provide an inlet or outlet to the tank. In some embodiments, ports 311 can incorporate quick-connect/disconnect interfaces (e.g., push-to-connect interfaces) to allow two tanks 301 to be quickly interconnected using a pipe 315 or other suitable conduit. For example, in FIG. 3A, system 300 has been designed such that water from the plumbing flows into the port 311 at the top left end of tank 301a. Tanks 301a and 301b are interconnected at the right end and tank 301b and 301c are interconnected at the left end such that the three tanks are connected in series. The bottom left port 311 of tank 301c is connected back to the plumbing or to a drain to form an outlet for system 300. A spigot 316 may be integrated into this outlet to provide access to the water stored in system 300. In some embodiments, a transparent pipe 341 may be interconnected between a port 311 of tank 301c and a port 311 of tank 301a to provide a water level indicator. A venting component 317 may also be connected to a port 311 of tank 301a to allow air to vent from within tanks 301.

In some embodiments, system 300 may be connected in series with one or more plumbing fixtures within a building (e.g., a sink). In such embodiments, flow control components 314 may be left open to allow water to continuously flow through system 300 when the plumbing fixtures are used. This can ensure that the water within system 300 will always be fresh and will not require manual refreshing. In such cases, venting component 317 and pipe 341 may not be necessary. In other embodiments, however, system 300 may be connected in parallel with the plumbing to allow the water within system 300 to be selectively refreshed by opening flow control components 314 at a desired time. As with system 100, system 300 can include a control system for automatically controlling the functioning of the various components.

Figure 4:
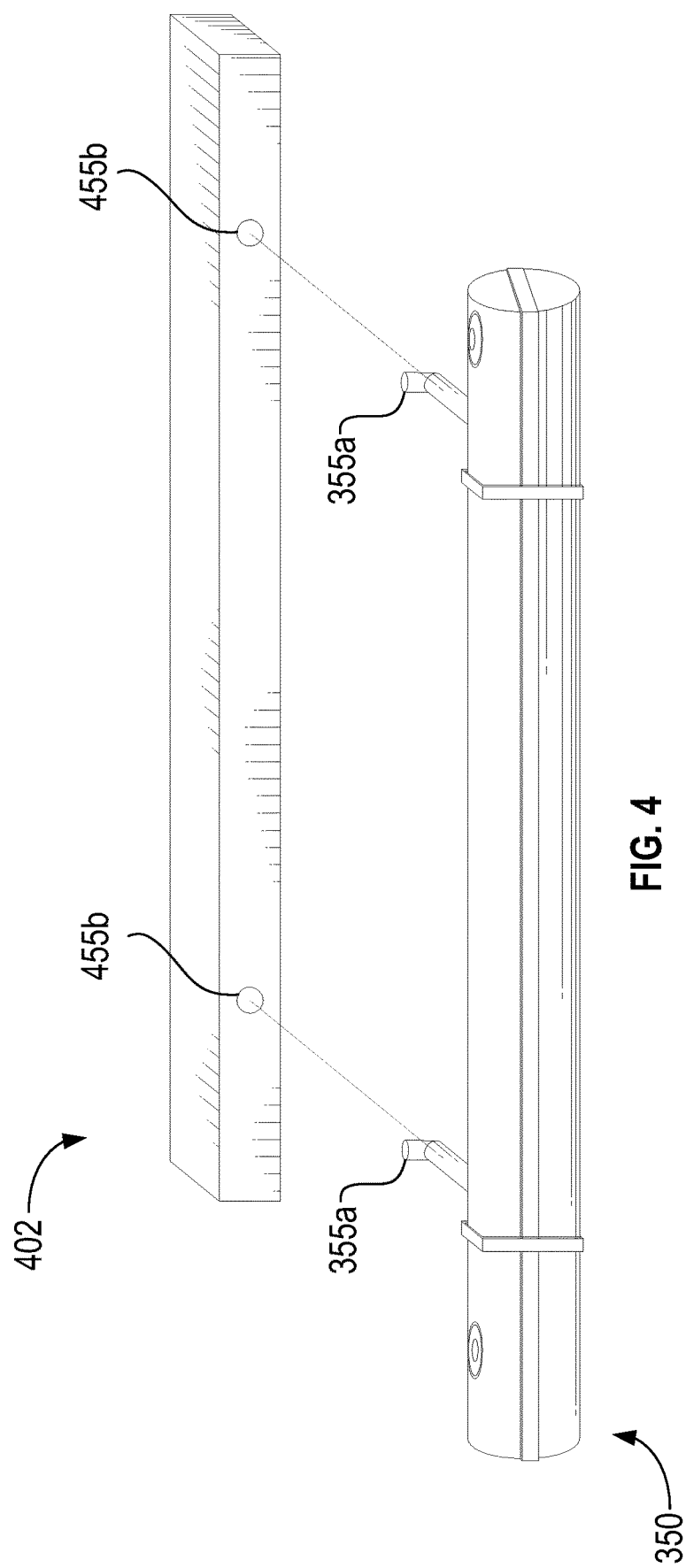
FIG. 4 illustrates another embodiment of a water storage system that includes a support for mounting a water tank.

FIG. 4 illustrates that different configurations of supports can be employed with pods 350. In this figure, a support 402 that is designed for mounting a single pod 350 is shown. Support 402 is in the form of an elongated beam that could be mounted to the wall, in the floor joists, or in any other location of a building. Support 402 includes openings 455b that are configured to receive securing structures 355a such that pod 350 is removably mounted to support 402. In some embodiments, securing structures 355a can be configured as quick-connect components so that pod 350 can be quickly removed from support 402. For simplicity, pod 350 is shown in isolation without any interconnects. However, similar interconnections as employed in system 300 could be used to interconnect multiple pods 350 that are mounted to the same or separate supports 402. For example, supports 402 could be mounted to a number of adjacent floor joists so that multiple pods 350 could be mounted between the joists. Similarly, supports 402 could be mounted around a room on the walls. Regardless of how the supports and pods are arranged, pods 350 can be interconnected in series in a similar fashion as shown in FIG. 3A or be one continuous POD utilizing full size elbows at the change of direction. In this way, water can be easily stored and accessed in locations where it was not previously possible.

In any of the above described embodiments, a number of additional features could be employed including: a pressure relief valve to prevent over-pressurization of the tanks, pressure gauges at various locations to monitor pressure within the system, a backflow preventer to ensure that water from the tanks will not flow back into a building's plumbing, one or more filters or other water cleaning devices such as UV lights, water temperature gauges, circulation pumps, and drinking fountain connections among others.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A water storage system for use with water storage tanks comprising:
   an inlet for connecting a first tank to a water source, the inlet including an upper interface component by which the inlet couples to the first tank and a flow control component for enabling water to flow from the water source into the first tank;
   an upper inter-tank connection for interconnecting the first tank with a second tank, the upper inter-tank connection including an upper interface component for each tank and one or more fittings or pipes for connecting the upper interface components together;
   a lower inter-tank connection for interconnecting the first tank with the second tank, the lower inter-tank connection including a lower interface component for each tank and one or more fittings or pipes for connecting the lower interface components;
   an outlet that is configured to couple to the lower inter-tank connection, the outlet including a flow control component for enabling the water to flow out from the first and second tanks; and
   a water level indicator connected between the upper inter-tank connection and the lower inter-tank connection.

2. The water storage system of claim 1, wherein each upper interface component extends through the corresponding tank.

3. The water storage system of claim 1, wherein the water level indicator includes a transparent pipe.

4. The water storage system of claim 1, further comprising:
a venting component coupled to the upper inter-tank connection.

5. The water storage system of claim 1, further comprising:
a spigot coupled to the outlet or the lower inter-tank connection.

6. The water storage system of claim 1, further comprising;
a platform configured to support the first and second tanks.

7. The water storage system of claim 1, wherein the water source is plumbing of a building in which the first and second tanks are located.

8. The water storage system of claim 1, wherein each upper interface component extends through a cap.

9. The water storage system of claim 1, wherein each lower interface component comprises a bulkhead fitting.

10. The water storage system of claim 1, wherein each upper interface component is integrated into a cap that attaches to a top surface of the corresponding tank.

11. A water storage system for use with water storage tanks comprising:
an inlet for connecting a first tank to a water source, the inlet including an upper interface component by which the inlet couples to the first tank and a flow control component for enabling water to flow from the water source into the first tank;
an upper inter-tank connection for interconnecting the first tank with a second tank, the upper inter-tank connection including an upper interface component for each tank and one or more fittings or pipes for connecting the upper interface components together, wherein each upper interface component is integrated into a cap that attaches to a top surface of the corresponding tank;
a lower inter-tank connection for interconnecting the first tank with the second tank, the lower inter-tank connection including a lower interface component for each tank and one or more fittings or pipes for connecting the lower interface components; and
an outlet that is configured to couple to the lower inter-tank connection, the outlet including a flow control component for enabling the water to flow out from the first and second tanks.

12. The water storage system of claim 11, further comprising:
a water level indicator.

13. The water storage system of claim 12, wherein the water level indicator is connected between the upper inter-tank connection and the lower inter-tank connection.

14. The water storage system of claim 13, wherein the water level indicator includes a transparent pipe.

15. The water storage system of claim 11, further comprising:
a venting component coupled to the upper inter-tank connection.

16. The water storage system of claim 11, further comprising:
a spigot coupled to the outlet or the lower inter-tank connection.

17. The water storage system of claim 11, further comprising:
a platform configured to support the first and second tanks.

18. The water storage system of claim 11, wherein the water source is plumbing of a building in which the first and second tanks are located.

19. The water storage system of claim 11, wherein each lower interface component comprises a bulkhead fitting.

20. A water storage system comprising:
an inlet for connecting a first tank to a building's plumbing, the inlet including an upper interface component by which the inlet couples to the first tank and a flow control component for enabling water to flow from the plumbing into the first tank;
an upper inter-tank connection for interconnecting the first tank with a second tank, the upper inter-tank connection including an upper interface component for each tank and one or more fittings or pipes for connecting the upper interface components together, wherein each upper interface component is integrated into a cap that attaches to a top surface of the corresponding tank;
a lower inter-tank connection for interconnecting the first tank with the second tank, the lower inter-tank connection including a lower interface component for each tank and one or more fittings or pipes for connecting the lower interface components;
an outlet that is configured to couple to the lower inter-tank connection, the outlet including a flow control component for enabling the water to flow out from the first and second tanks; and
a venting component that is configured to vent air from within the upper inter-tank connection.

\* \* \* \* \*